Patented Oct. 15, 1935

2,017,279

UNITED STATES PATENT OFFICE 2,017,279

PROCESS FOR MAKING READILY SOLUBLE COMPLEX THEOPHYLLINE COMPOUNDS

Paul Reinhold Grüter, Berlin-Charlottenburg, Germany

No Drawing. Application April 16, 1935, Serial No. 16,731. In Germany July 30, 1931

5 Claims. (Cl. 260—33)

The diuretic action of theophylline-ethylenediamine, which has been proved to be a diuretic, has already been improved by uniting it with a large quantity of calcium chloride under the action of ethylenediamine salicylate. This calcium chloride, however, remains as such in the mixture since the calcium remains combined with the strongest acid. Furthermore, several molecules of $CaCl_2$ are here united with a little, at most $2/3$ mol., theophylline.

The object of this invention is to convert theophylline-ethylenediamine into a product by the application of which the diuretic action is not strengthened but an improvement is attained in a central (that is to say acting on the brain) spasmolytic (antispasmodic) direction.

It has been found that the theophylline-ethylenediamine prepared from 1 mol. of theophylline and 1 mol. of ethylenediamine (or somewhat more) and therefore equimolecular, is capable of dissolving up to about $1/5$ mol. of 5,5-phenyl-ethyl barbituric acid, and in this way, surprisingly enough, complex products of very high solubility are obtained which rectally act very rapidly and, furthermore, can be intraveneously and intramuscularly injected as well with an action which sets in at once. They have proved to be vessel agents of enhanced efficacy, that is to say they have been found to have a dilating effect on the cerebral vessels and on the blood circulation.

For the purpose of making the new complex products the starting materials may be brought together in any desired sequence, either with or without solvents. A small excess of ethylenediamine is advisable in view of the sensitivity thereof to the carbonic acid of the air.

The complex products readily dissolve in water, to the extent of 30 per cent. at least, but on the other hand they dissolve to only a small extent in alcohol. They are complex compounds or a mixture of complex products. Neither theophylline nor barbituric acid (except in traces only) can be dissolved out of the complexes by means of organic solvents. They are decomposed by alkalies and acids; they are, in fact, already decomposed by carbonic acid. The solid products are crystalline without any fixed melting point since they split off amine before and during fusion.

*Example 1.*—198 parts by weight of powdered theophylline (1 mol.), 23 parts by weight of 5,5-phenylethyl barbituric acid ($\frac{1}{10}$ mol.) in pulverized form, 78 parts by weight of ethylenediamine hydrates (1 mol.), consisting of 60 parts by weight of ethylenediamine and 18 parts by weight of water, are very intimately rubbed up with one another until tests show that the reaction product has become quite soluble in water. The product is then evaporated to dryness in vacuo at about 40° C.

*Example 2.*—258 parts by weight of equimolecular theophylline-ethylenediamine (1 mol.), 23 parts by weight ($\frac{1}{10}$ mol.) of 5,5-phenylethyl barbituric acid and 20 parts by weight of water are very intimately rubbed up together until the product has become soluble in water; the product is then dried in a vacuum.

*Example 3.*—198 parts by weight of theophylline (1 mol.), 33 parts by weight ($\frac{1}{7}$ mol.) of 5,5-phenylethyl barbituric acid, 86 parts by weight of ethylenediamine hydrate and 10 parts by weight of alcohol are intimately rubbed up with one another until the product has become water-soluble and then the alcohol and the water is distilled off in a vacuum. The excess ethylenediamine is hereby distilled off at the same time.

Having now described my invention what I claim as new and desire to secure by Letters Patent is:—

1. Process for preparing readily soluble complex theophylline compounds consisting in interacting 5,5-phenylethyl barbituric acid, in a quantity which does not exceed $1/5$ molecule of the acid, with 1 molecule of equimolecular theophylline-ethylenediamine until a product is formed which is soluble in water.

2. Process for preparing readily soluble complex theophylline compounds consisting in interacting equimolecular quantities of theophylline and ethylenediamine hydrate $\frac{1}{7}$ molecule of 5,5-phenylethyl barbituric acid.

3. Process for preparing readily soluble complex theophylline compounds consisting in intimately rubbing up equimolecular quantities of theophylline and ethylenediamine hydrate with $\frac{1}{10}$ molecule of 5,5-phenylethyl barbituric acid until a product is formed which is soluble in water and then drying the resulting product in a vacuum.

4. Process for preparing readily soluble complex theophylline compounds consisting in intimately rubbing up equimolecular quantities of theophylline and ethylenediamine with $\frac{1}{10}$ molecule of 5,5-phenylethyl barbituric acid with addition of water until a water-soluble product is formed and then drying the product obtained in vacuo.

5. Process for preparing readily soluble complex theophylline compounds consisting in intimately rubbing up equimolecular quantities of theophylline and ethylenediamine with $\frac{1}{10}$ molecule of 5,5-phenylethyl barbituric acid with addition of alcohol until a product is formed which is soluble in water and then drying the product obtained in vacuo.

PAUL REINHOLD GRÜTER.